(12) United States Patent
Aldridge et al.

(10) Patent No.: US 7,699,135 B2
(45) Date of Patent: Apr. 20, 2010

(54) INTEGRATED HYDRAULIC CONTROL SYSTEM

(75) Inventors: William R. Aldridge, Vancouver, WA (US); Ronald G. Warnecke, Milwaukie, OR (US)

(73) Assignee: NMHG Oregon, LLC, Portland, OR (US)

( * ) Notice: Subject to any disclaimer, the term of this patent is extended or adjusted under 35 U.S.C. 154(b) by 737 days.

(21) Appl. No.: 11/365,721

(22) Filed: Feb. 28, 2006

(65) Prior Publication Data

US 2006/0169521 A1 Aug. 3, 2006

Related U.S. Application Data

(63) Continuation-in-part of application No. 10/290,899, filed on Nov. 8, 2002, now Pat. No. 7,036,625.

(51) Int. Cl.
*B62D 5/06* (2006.01)
(52) U.S. Cl. .................. 180/417; 180/402; 180/403; 180/434; 180/439; 180/441; 91/516; 60/422; 137/625.21; 137/613; 137/118.06
(58) Field of Classification Search ................ 180/417, 180/402, 403, 434, 439, 441, 442; 91/516; 60/422; 137/625.21, 613, 118.06
See application file for complete search history.

(56) References Cited

U.S. PATENT DOCUMENTS

| | | | | | |
|---|---|---|---|---|---|
| 3,270,681 | A | * | 9/1966 | Charlson | 418/61.3 |
| 3,334,705 | A | * | 8/1967 | Lam | 180/441 |
| 3,455,210 | A | * | 7/1969 | Allen | 91/446 |
| 3,481,147 | A | * | 12/1969 | Goff | 60/384 |
| 3,908,375 | A | * | 9/1975 | Young | 60/422 |
| 3,996,742 | A | * | 12/1976 | Goff | 60/422 |
| 4,076,096 | A | * | 2/1978 | Hushower et al. | 180/406 |
| 4,312,379 | A | * | 1/1982 | Kinder | 137/625.48 |
| 4,371,002 | A | * | 2/1983 | Tischer | 137/625.3 |
| 4,457,132 | A | * | 7/1984 | Roberts | 60/384 |
| 4,495,770 | A | * | 1/1985 | Sagaser et al. | 60/486 |
| 5,065,793 | A | * | 11/1991 | Stephenson et al. | 137/625.24 |
| 5,129,424 | A | * | 7/1992 | Stephenson et al. | 137/625.24 |
| 5,617,724 | A | * | 4/1997 | Ko | 60/422 |
| 5,896,943 | A | * | 4/1999 | Christensen | 180/442 |
| 5,941,338 | A | * | 8/1999 | Miller et al. | 180/421 |
| 6,073,536 | A | * | 6/2000 | Campbell | 91/516 |
| 6,164,310 | A | * | 12/2000 | Yamashita | 137/119.06 |
| 6,622,753 | B2 | * | 9/2003 | Thordarson et al. | 137/613 |
| 6,691,729 | B2 | * | 2/2004 | Takeda et al. | 137/74 |
| 6,742,540 | B2 | * | 6/2004 | Kim | 137/513.3 |

FOREIGN PATENT DOCUMENTS

DE          10117166 A1  * 10/2002

* cited by examiner

*Primary Examiner*—Lesley Morris
*Assistant Examiner*—Michael R Stabley
(74) *Attorney, Agent, or Firm*—Stolowitz Ford Cowger LLP (57) ABSTRACT

A hydraulic system including a control valve and a steering control assembly. The steering control assembly includes a steering control unit and a priority flow divider contained in a single unitary casing. The steering control assembly is attached adjacently with and directly to the control valve by means of an interface that fluidly connects the control valve with the steering control assembly.

20 Claims, 8 Drawing Sheets

INTEGRATED HYDRAULIC CONTROL SYSTEM

This application is a Continuation In Part of, and claims priority from U.S. patent application Ser. No. 10/290,899, filed on Nov. 8, 2002 now U.S. Pat No. 7,036,625, the contents of which are herein incorporated by reference in their entirety.

BACKGROUND

Figure 1:
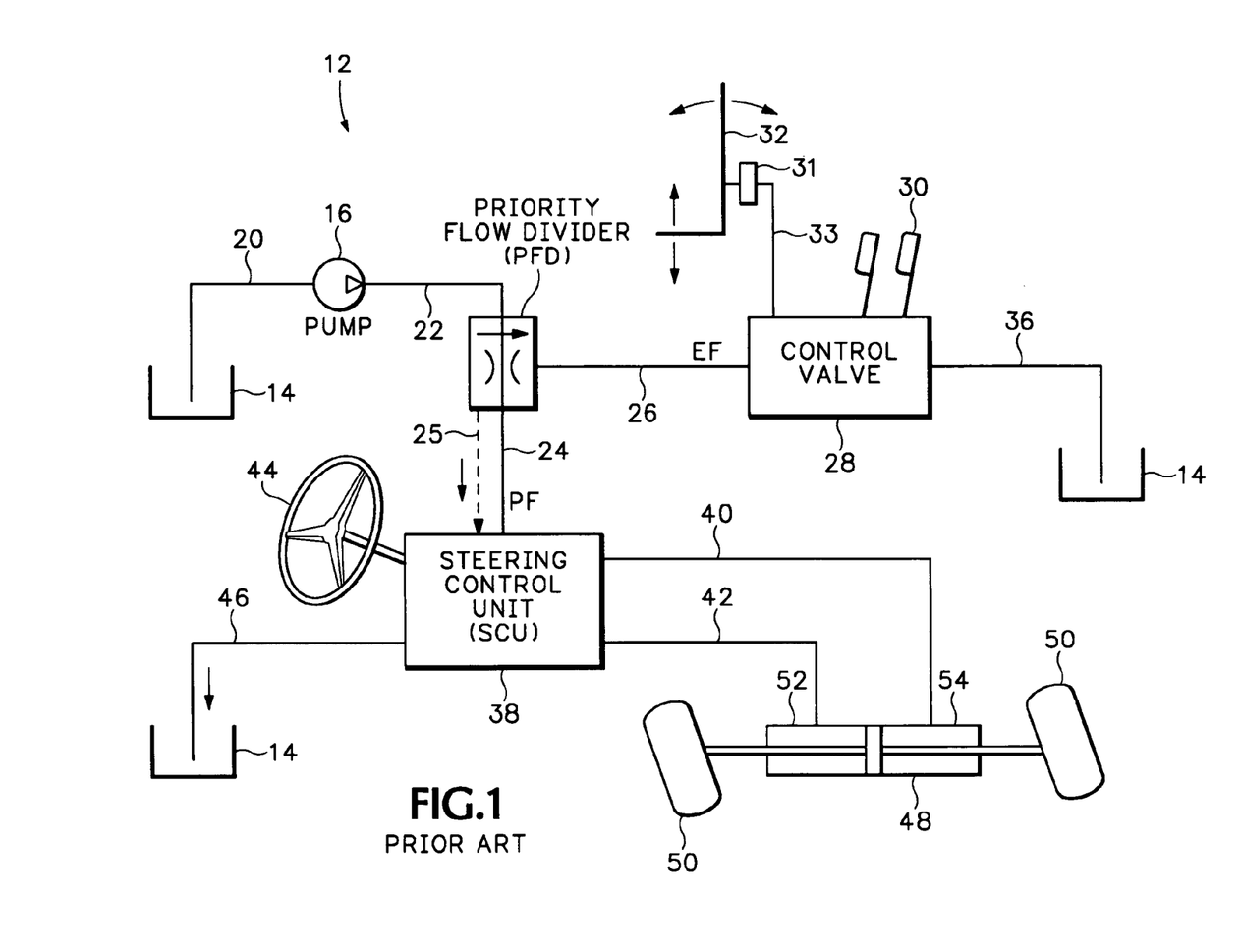
FIG. 1 is a schematic diagram of a conventional hydraulic control system.

FIG. 1 shows a hydraulic control system used in a lift truck. A pump 16 pumps hydraulic fluid from a tank 14 into a Priority Flow Divider (PFD) 18. The PFD 18 maintains a hydraulic Priority Flow (PF) to a Steering Control Unit (SCU) 38. An Excess Flow (EF) is sent to a hydraulic control valve 28.

The SCU 38 uses the hydraulic fluid from PFD 18 to control a hydraulic piston 48 that controls the direction of wheels 50. For example, when a steering wheel 44 is turned in a first direction, the SCU 38 may direct hydraulic fluid into a first hydraulic hose 40 connected to a first side 54 of the hydraulic piston 48. The hydraulic fluid in hose 40 causes the piston 48 to turn the wheels 50 in a first direction. Hydraulic fluid located in the opposite side 52 of piston 48 exits through hose 42 back to the SCU 38 and then out hose 46 to tank 14.

If steering wheel 44 is turned in the opposite direction, the SCU 38 directs hydraulic fluid through hose 42 into side 52 of piston 48. The fluid in hose 42 causes the piston 48 to turn the wheels 50 in the opposite direction. The hydraulic fluid in side 54 of piston 48 exits through hose 40 through the SCU 38 and hose 46 back to tank 14.

The EF flow from PFD 18 goes through hose 26 to the control valve 28. The control valve 28 uses the hydraulic fluid to control a hydraulic actuator 31. The returning hydraulic fluid from the hydraulic actuator 31 returns back to the control valve 28 and then travels out hose 36 to the hydraulic fluid tank 14.

The control valve 28 and hydraulic actuator 31 can be used to control any type of hydraulic equipment, but is shown in one example in FIG. 1 controlling a fork lift mast 32. The items 20, 22, 24, 26, 33, 36, 40, 42, and 46 are described as hydraulic fluid hoses but can be any type of fluid conductor, such as tubes, pipes, etc., that direct hydraulic fluid between the different components in the hydraulic control system 12.

The hydraulic system shown in FIG. 1 requires a large number of hydraulic hoses. For example, hoses 20 and 22 are needed to supply hydraulic fluid to PFD 18. Hoses 24 and 26 are required to transport hydraulic fluid to the SCU 38 and the control valve 28, respectively. In addition to using the hose 24, the SCU 38 also requires the two steering piston hoses 40 and 42 and a return tank hose 46. For a load sensing PFD, another load sense hose 25 is required between the PFD 18 and the SCU 38. In addition to the hydraulic actuator hoses 33, the control valve 28 uses hose 26 from the PFD 18 and a tank return hose 36.

These hydraulic hoses, tubes, pipes, etc. add expense to the hydraulic system. For example, added time is required to fabricate and install all of the hoses to the different hydraulic components. Each end of each hydraulic hose requires connector fittings that have the potential of oil leakage. The long lengths of the hoses between the different hydraulic components can also reduce hydraulic pressure in the system, in turn, reducing the response time of the hydraulic equipment. To improve response time, hydraulic pressure must then be increased in the hydraulic system.

The present invention addresses this and other problems associated with the prior art.

SUMMARY OF THE INVENTION

An integrated hydraulic control system includes a steering control unit and a priority flow divider integrated into a unitary casing. An interface fluidly couples the casing for the steering control unit and priority flow divider directly to a control valve casing. All hydraulic communication between the steering control unit, the priority flow divider, and the control valve are located inside the casings.

The foregoing and other objects, features and advantages of the invention will become more readily apparent from the following detailed description of a preferred embodiment of the invention which proceeds with reference to the accompanying drawings.

DETAILED DESCRIPTION

Figure 2:
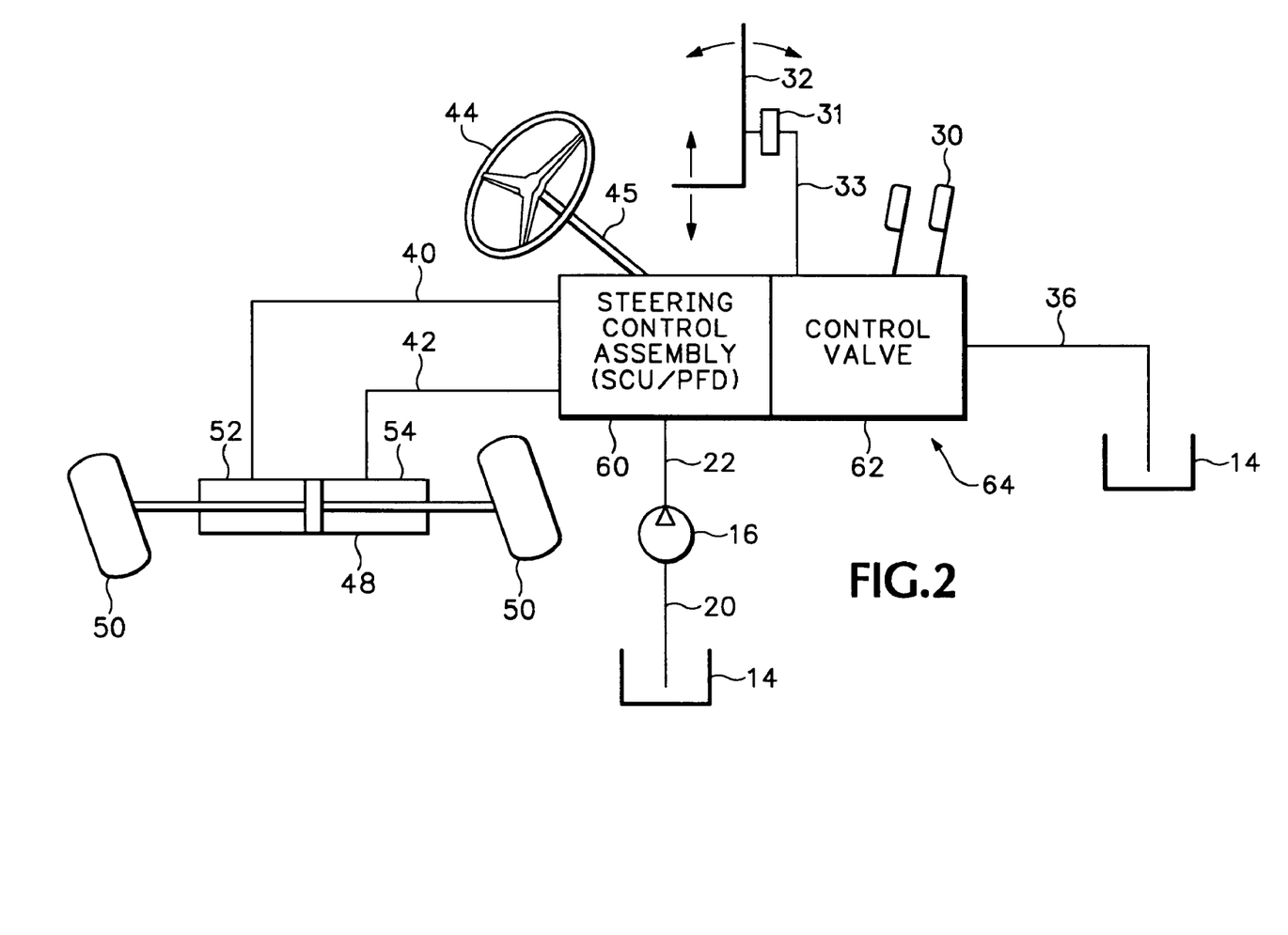
FIG. 2 is a schematic diagram showing an integrated hydraulic control system according to one embodiment of the invention.

FIG. 2 shows an integrated hydraulic control system 64 that includes a steering control assembly 60 and a control valve 62. The steering control assembly 60 integrates together a Steering Control Unit (SCU) and a Priority Flow Divider (PFD). The steering control assembly 60 in one embodiment attaches directly to the side of the control valve 62. Integrating the functions of the SCU and PFD together into a single assembly 60 eliminates many of the hydraulic hoses and associated fittings that are normally required in hydraulic steering control systems. The number of hoses needed in the hydraulic control system is further reduced by connecting the steering control assembly 60 directly to the control valve 62. For example, the steering control assembly 60 requires only three external hydraulic hoses. The hose 22 from the hydraulic pump 16 and the two hoses 40 and 42 used for controlling the steering piston 48. The control valve 62 only needs the hydraulic hoses 33 used for the hydraulic actuator 31 and the tank return hose 36.

As described above with respect to FIG. 1, the external hydraulic hoses 20, 22, 33, 36, 40, and 42 in FIG. 2 can be any type of fluid connector that is capable of carrying hydraulic fluid. The integrated hydraulic control system 64 is shown used in a fork lift truck. For example, the control valve 62 can be used to control operations of fork lift mast 32.

However, it should be understood that the steering control assembly 60 and different types of control valves 62 can be combined to control any type of hydraulic operation on any type of vehicle. A few examples include construction equipment, landscape development and maintenance equipment, agricultural equipment, manlift/aerial platform equipment, maintenance equipment, or any other type of equipment that requires hydraulic control.

Figure 3:
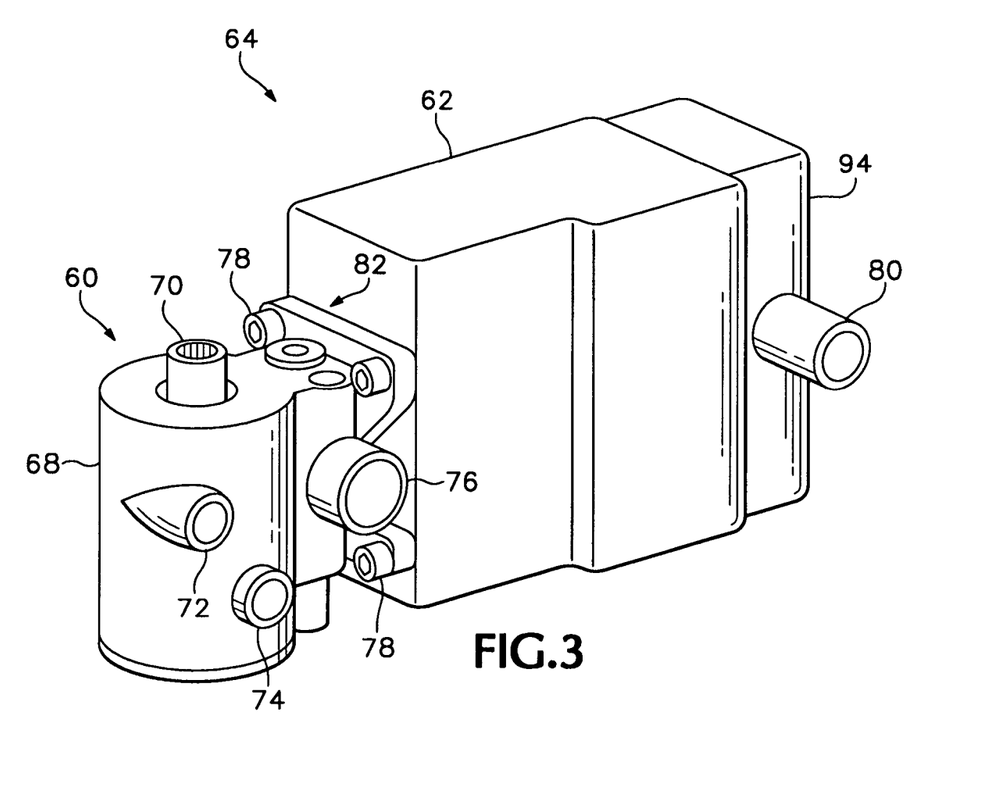
FIG. 3 is a perspective view of the integrated hydraulic control system.

FIG. 3 shows a perspective view of the integrated hydraulic control system 64. The steering control assembly 60 in this embodiment is attached directly to the control valve 62 with bolts 78. A unitary casing 68 contains internal channels that fluidly couple the steering control unit together with the PFD in the steering control assembly 60. Some of these internal channels also fluidly couple the steering control assembly 60 to the control valve 62. The internal fluid connections inside the steering control assembly 60 and the internal fluid connections between the steering control assembly 60 and the control valve 62 are shown in more detail in FIG. 4.

A single external pump port 76 is formed in casing 68 and provides hydraulic fluid to both the steering control assembly 60 and the control valve 62. Two external steering control ports 72 and 74 are formed in casing 68 and connect to the hydraulic hoses 40 and 42 shown in FIG. 2. A steering control spool 70 extends from the top of assembly 60 and is connected by a steering column 45 to steering wheel 44 shown in FIG. 2.

The integrated hydraulic control system 64 shown in FIG. 3 is a preferred embodiment. However, there could be other embodiments where any combination of the external pump port 76 and external steering control ports 72 and 74 are located on the control valve 62. Internal channels extending between the control valve 62 and steering control assembly 60 then carry hydraulic fluid from the external ports 72, 74, or 76 to the steering control assembly 60. In another embodiment, the common tank port 80 may be located on the steering control assembly 60.

Figure 8:
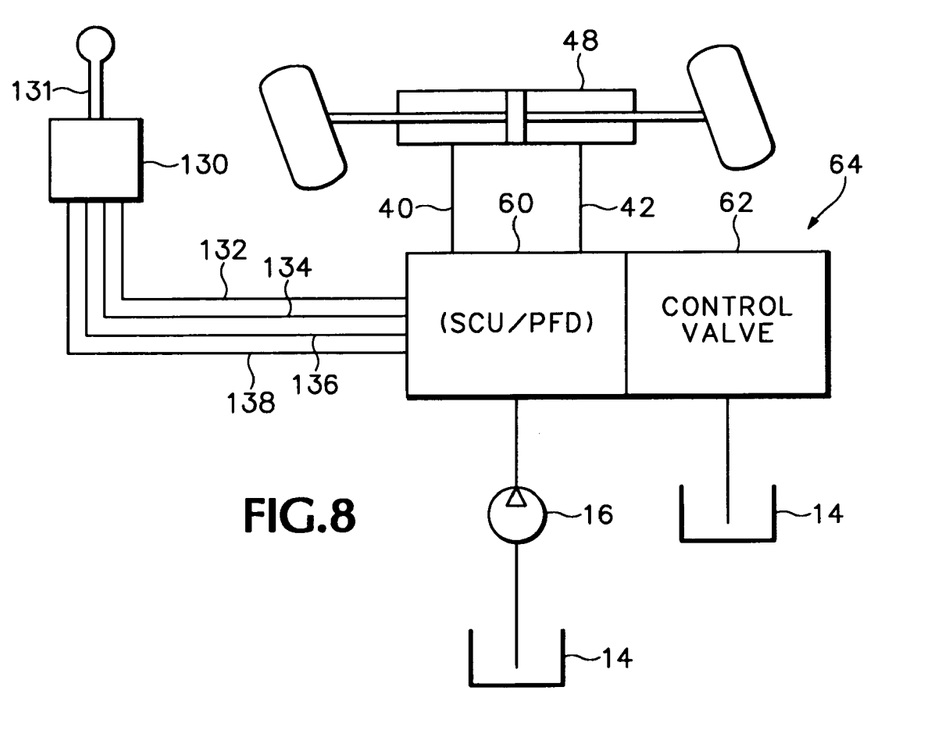
FIG. 8 is a schematic diagram of an alternative embodiment of the integrated hydraulic control system that uses a lever type steering actuator.

It is also not necessary that the steering control assembly 60 include a rotary type steering control unit. For example, an alternative lever actuated steering control assembly is shown in FIG. 8. A variety of different types of priority flow dividers can also be incorporated into the steering control assembly 60.

An interface 82 fluidly couples internal hydraulic channels in the steering control assembly 60 with internal hydraulic channels in the control valve 62. The interface 82 eliminates some of the external hoses that are normally used for providing hydraulic communication. The steering control assembly 60 may be attached adjacently with and directly to the control valve 62 by means of bolts, screws, rivets, welding or other fastening systems known in the art. In this way, the control valve 62 may fluidly interconnect with the steering control assembly 60 without the use of any external fluid connectors such as hoses or tubes.

Other portions of the control valve 62 are conventional and may be implemented using a variety of commercially available control valve equipment. One category of operations that can be incorporated into the control valve 62 are associated with lift trucks. For example, the control valve 62 can be used for controlling a fork lift. However, as described above, any type of control valve 62 can be attached to the steering control assembly 60 for performing any type of hydraulic control operation. The general operation of control valves are known to those skilled in the art. Therefore, the operation of control valve 62, other than as it relates to interface 82, will not be described in further detail.

An external tank return port 80 is coupled to tank 14 (FIG. 2) by the hose 36 shown in FIG. 2. The tank return port 80 returns hydraulic fluid for both the steering control assembly 60 and the control valve 62 back to tank 14. Thus, the entire integrated hydraulic control system 64 in one embodiment requires only a single input pump port 76, a single tank return port 80, and two steering control ports 72 and 74.

Figure 4:
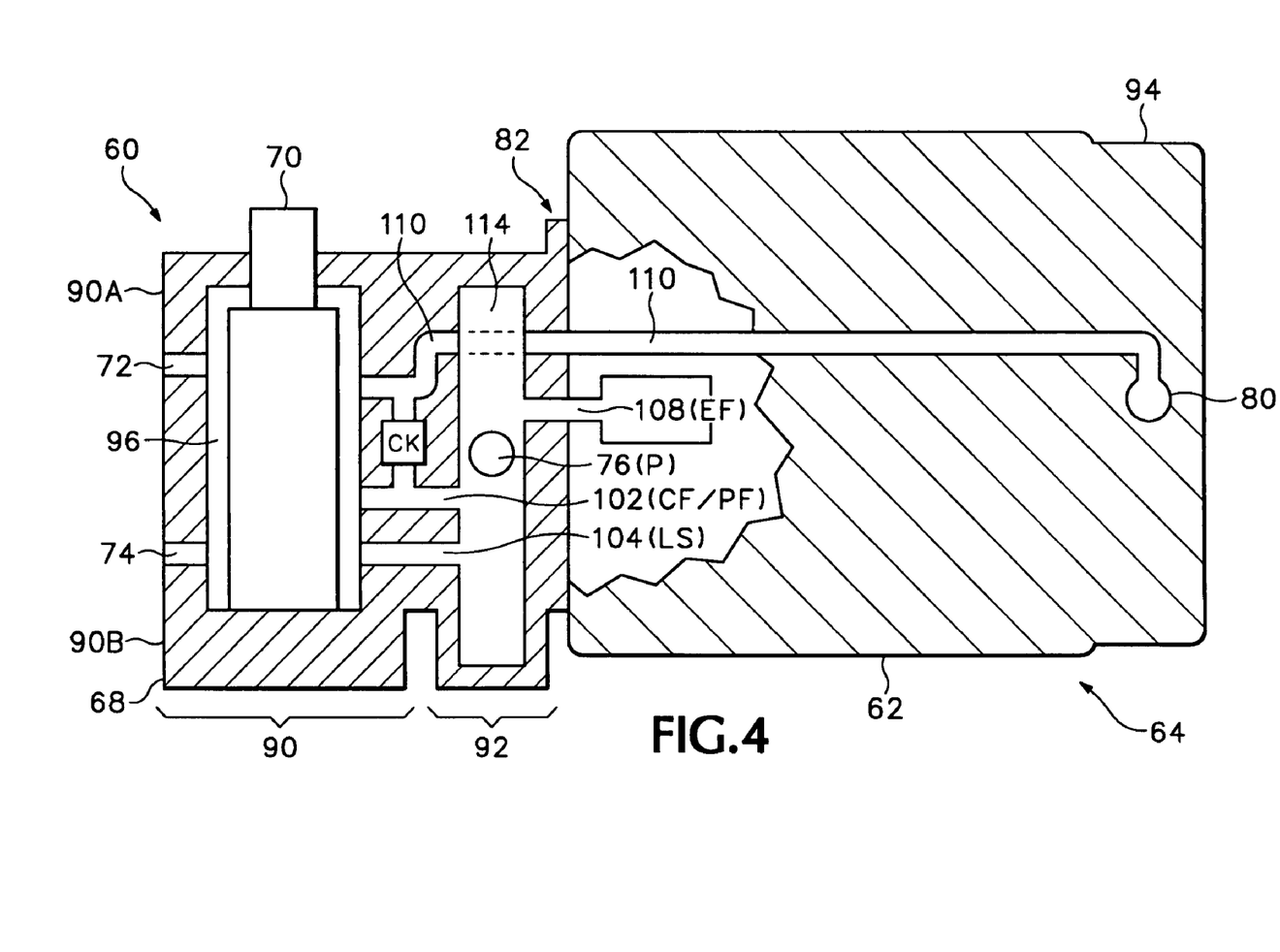
FIG. 4 is a cutaway view of the integrated hydraulic control system.

FIG. 4 shows a cutaway of the integrated hydraulic control system 64. The steering control assembly 60 includes a steering control unit 90 and a PFD 92. The PFD 92 includes a spool 114 that directs hydraulic fluid to the steering control unit 90 and to the hydraulic control valve 62. While a rotary type steering control unit 90 is shown in FIG. 4, various different types of steering control units can be integrated into the steering control assembly 60. For example, a lever or joystick actuated steering control unit is shown in FIG. 8. The steering control unit can be hydraulically actuated or electronically actuated by the steering wheel or other type of steering device.

The external pump port 76 supplies hydraulic fluid into the PFD 92. A control flow channel 102 directs the hydraulic fluid from the PFD 92 to the steering control unit 90. An excess flow channel 108 directs hydraulic fluid, not used by the steering control unit 90, from the PFD 92 to the control valve 62.

The PFD 92 can be an open-center type device that supplies hydraulic fluid to the steering control unit 90. Alternatively, the PFD 92 may be a load sense type device that supplies hydraulic fluid to the steering control unit 90 on demand. In the case of a load sense type PFD, a load sense channel 104 fluidly connects a pressure sense port on the PFD spool 114 with the steering control unit 90. For the open-center type PFD, the load sense channel 104 may not be required. In the open-center configuration, the channel 102 may supply a continuous priority flow from the PFD 92 to the steering control unit 90.

For the rotary type steering control unit 90, a sleeve 96 contains spool 70. The two steering control ports 72 and 74 are fluidly connected to sleeve 96 through internal channels in casing 68. A control section 90A of steering control unit 90 directs the flow of hydraulic fluid to external ports 72 and 74 according to the steering direction of the steering wheel 44 (FIG. 2). A metering section 90B is used to pump hydraulic fluid to the hydraulic piston 48 (FIG. 2).

When the steering wheel 44 (FIG. 2) is turned, the steering column 45 causes spool 70 to rotate. The spool 70 stops moving when it touches a center pin (not shown). In this position, holes in the sleeve 96 and the spool 70 are aligned allowing hydraulic fluid to flow through the sleeve 96 into the metering section 90B.

More rotation of the steering wheel causes the spool 70 to rotate the pin. This action rotates the sleeve 96 causing a rotor in the metering section 90B to rotate. The hydraulic fluid then flows either to steering control port 72 or 74 according to the direction of rotation of spool 70. Hydraulic fluid is returned from the hydraulic steering piston 48 through the other port 72 or 74. If the spool 70 is turned in the opposite direction, hydraulic fluid is pumped by the metering section 90B to the opposite channel 72 or 74 and the other port 72 or 74 receives hydraulic fluid back from the steering piston 48. Since the general operation of a steering control unit is generally known to those skilled in the art, it is not described in further detail.

The steering control port 72 or 74 operating as the return path passes hydraulic fluid through the steering control unit 90 to a tank return channel 110. The tank return channel 110 passes across interface 82 between the steering control assembly 60 and the control valve 62. The tank return channel 110 runs along the length of the control valve 62 to tank return port 80. The tank return channel 110 is coupled to hydraulic valves (not shown) in the control valve 62 and operates as a common tank return for both the steering control unit 90 and any hydraulic control devices located in control valve 62. The tank return port 80 in control valve outlet 94 returns hydraulic fluid from steering control unit 90 and control valve 62 back to tank 14 (FIG. 2).

The steering control unit 90 and the PFD 92 are in close proximity allowing a relatively short control flow channel 102 and load sense channel 104. The short distances of these two channels allows the PFD 92 to respond faster to hydraulically actuated conditions generated by the steering control unit 90. In an alternate embodiment, the interface 82 of FIG. 4 is removed altogether such that the control valve 62, steering control unit 90 and PFD 92 are contained in a single unitary casing of a hydraulic assembly.

Figure 5:
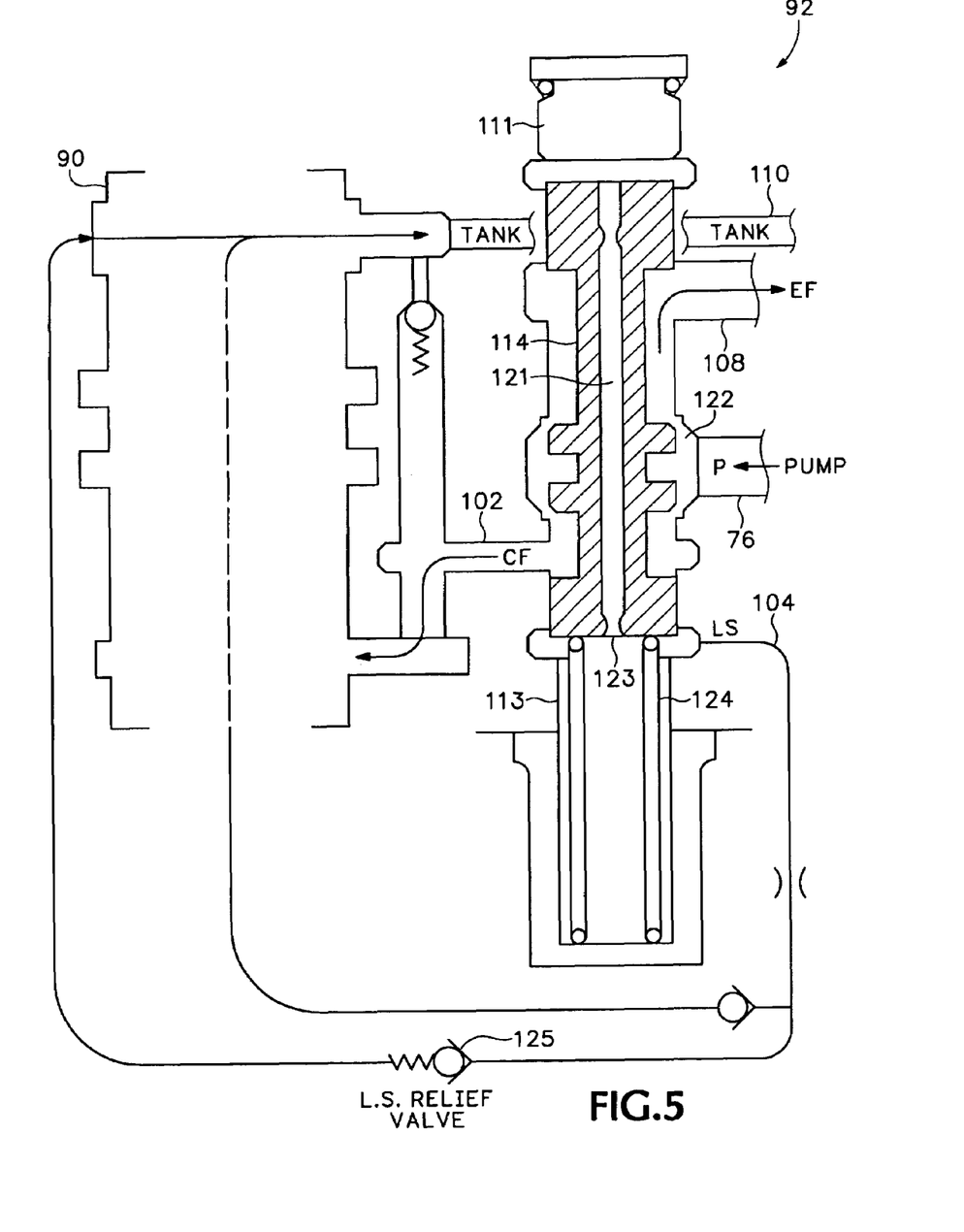
FIG. 5 is a cutaway view of one type of priority flow divider that can be used in the integrated hydraulic control system.

FIG. 5 shows a cross-section for one type of PFD 92 that can be used in the steering control assembly 60. The pump port 76 receives hydraulic fluid from the pump 16 shown in FIG. 2. The hydraulic fluid flows from the pump port 76 through chamber 122 and the control flow channel 102 into the center passage 121 of spool 114. The fluid passing through passage 121 pressurizes both the top end and the bottom end of spool 114.

A neutral steering condition refers to a condition where an operator is not turning the steering wheel. In a neutral steering condition, a small amount of hydraulic fluid flows out through an orifice 123 at the bottom end of the spool 114. The hydraulic fluid flows from the bottom end of spool 114 through the Load Sense (LS) channel 104 and steering control unit 90 then out the tank return channel 110. This flow causes hydraulic fluid pressure at a top end 111 of the spool 114 to be greater than the hydraulic fluid pressure at the bottom end 113 of spool 114.

This differential pressure between the top and bottom ends of spool 114 causes the spool 114 to move downwards closing off hydraulic fluid flow to the CF channel 102. There is still a small amount of hydraulic fluid flow passing through LS channel 104. The lowered position of spool 114 causes the hydraulic fluid from pump port 76 to flow up through chamber 122 and out the excess flow channel 108 to the control valve 62.

When a vehicle operator starts turning the steering wheel or other type of steering actuator, the steering control unit 90 blocks the flow of hydraulic fluid through load sense channel 104. This causes the hydraulic fluid pressures at the top end 111 and bottom end 113 of spool 114 to equalize. The equalized fluid pressures allow spring 124 to push the spool 114 upwards. In the upward position of spool 114, fluid from pump port 76 flows through chamber 122 out control flow channel 102 to the steering control unit 90. At the same time the spool 114 reduces the flow of fluid from pump port 76 to excess flow channel 108 in proportion to the flow consumed by the steering control unit 90. A load sense relief valve 125 limits the maximum steering pressure.

It should be understood that this is only an example of one type of priority flow divider. Any different type of priority flow divider can be used in the steering control assembly 60.

Figure 6:
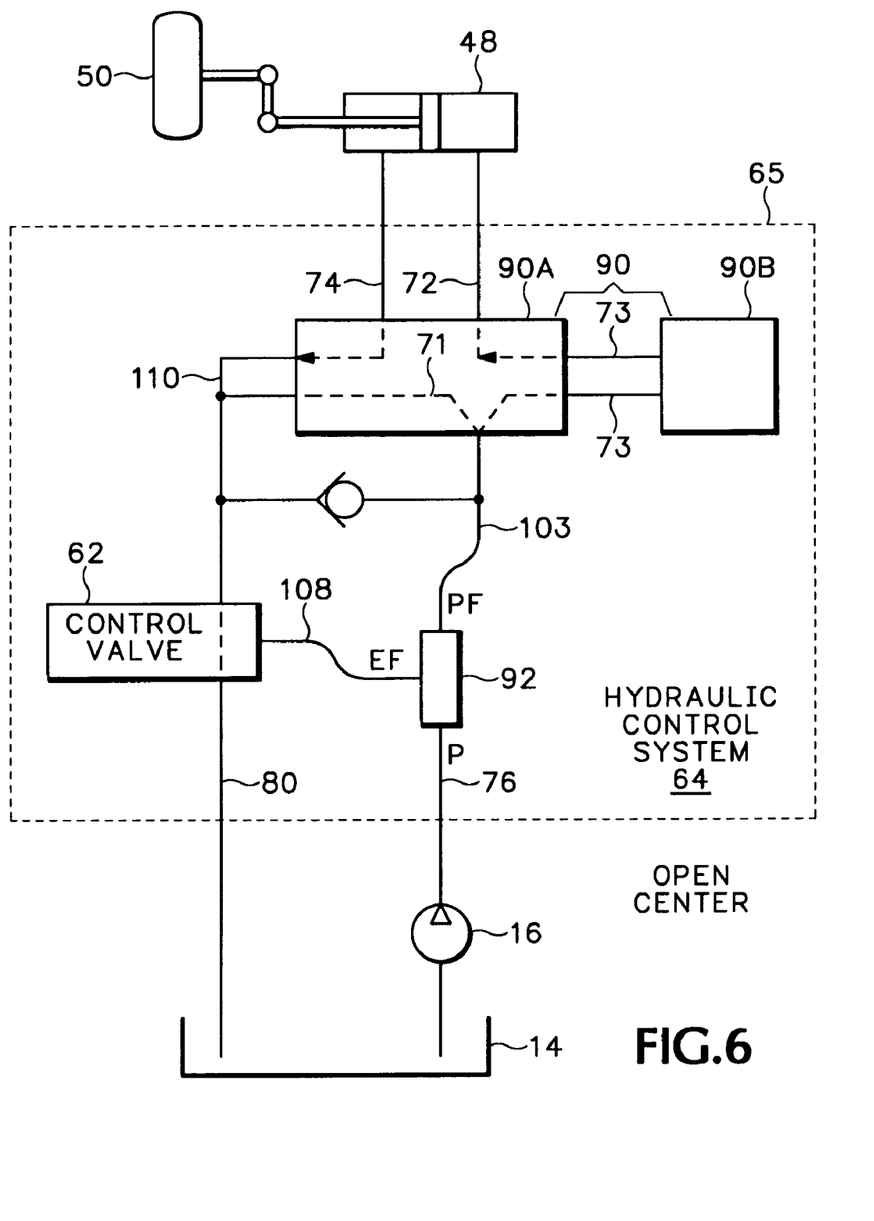
FIG. 6 is a flow diagram for an open center PFD configuration that can be used in the integrated hydraulic control system.

FIG. 6 is a hydraulic flow diagram showing further how the integrated hydraulic control system 64 operates when configured with an open center type priority flow system. All hydraulic connections within dashed box 65 are internal channels formed within the casing 68 of the steering control assembly 60 or internal channels formed between the casing of steering control assembly 60 and the casing of control valve 62. The steering control unit 90 is shown in two functional pieces, the control section 90A and the metering section 90B.

In the open center configuration, the priority flow divider 92 supplies a constant flow of hydraulic fluid to the steering control section 90A. When the vehicle steering wheel or alternative type of steering actuator is not being turned or actuated, the steering control unit 90 is in a neutral state. In the neutral state, the metering section 90B does not pump hydraulic fluid into hydraulic piston 48. The control section 90A feeds fluid from priority flow channel 103 through path 71 in the control section 90A to the tank return channel 110. The excess flow channel 108 supplies the hydraulic fluid to the control valve 62.

Depending on which direction the steering wheel 44 (FIG. 2) is turned, hydraulic fluid is pumped by the metering section 90B from priority flow channel 103, through path 73 and out either steering control port 72 or 74. In this example, hydraulic fluid is shown being pumped by metering section 90B out steering control port 72. The output flow from piston 48 is received by the steering control section 90A through port 74 and sent out through tank return channel 110. The return fluid flows through tank return channel 110 in control valve 62 and out tank return port 80 to the tank 14.

When the steering wheel is turned in the opposite direction, metering section 90B pumps hydraulic fluid from priority flow channel 103 through path 73 and out steering control port 74. The output fluid from piston 48 is received from steering control port 72 and sent out tank return channel 110.

Figure 7:
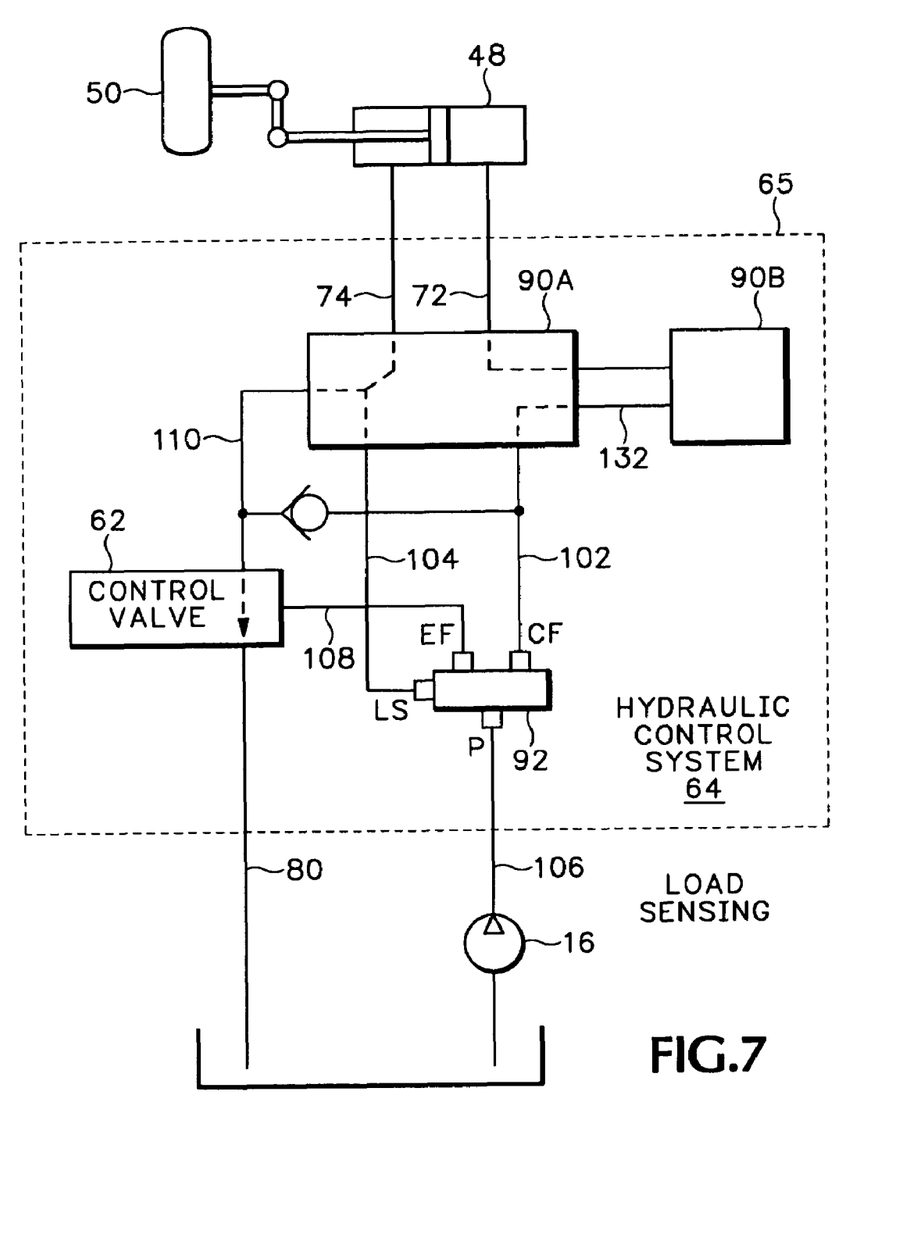
FIG. 7 is a flow diagram for a load sensing PFD configuration that can be used in the integrated hydraulic control system.

FIG. 7 shows the integrated hydraulic control system 64 configured as a load sensing system. In the load sensing system, the load sensing channel 104 bleeds off hydraulic fluid in PFD 92 back to tank return channel 110. If the steering control unit 90 is in the neutral condition, the PFD 92 directs the hydraulic fluid from pump 16 through the excess flow channel 108 to control valve 62.

When the steering control unit 90 is actuated, flow through the load sense channel 104 is shut off causing the PFD 92 to direct hydraulic fluid from pump 16 out control flow channel 102. The metering section 90B supplies hydraulic fluid from the control flow channel 102 to either steering control port 72 or 74. The return flow from steering piston 48 is received by the control section 90A and output to the tank return channel 110.

FIG. 8 shows an alternative embodiment where a lever or joystick type steering actuator 130 is used with the integrated hydraulic control system 64. The connections between the actuator 130 and the steering control assembly 60 can be either hydraulic, electronic or mechanical.

In a hydraulic interface, line 132 is a hydraulic pilot line that supplies hydraulic pilot flow to the steering actuator 130. Depending on the movement of the lever 131, hydraulic pilot flow is directed from the actuator 130 either to hydraulic steering control line 134 or 136. The steering control assembly 60 then routes hydraulic fluid to one of the steering control hoses 40 or 42 according to which one of the control lines 134 or 136 is actuated. Line 138 is a hydraulic pilot flow tank return line that is coupled to the tank return channel 110 in the steering control assembly 60.

In another embodiment, an electrical system is used to interface the actuator 130 to the steering control assembly 60. In this embodiment, the lines 132-138 represent electrical conductors. The actuator 130 activates different electrical signals depending upon what steering direction is indicated by the lever 131. For example, the actuator 130 may activate an electrical signal on electrical conductor 132 to indicate a right turn and activate an electrical signal on electrical conductor 134 to indicate a left turn. The steering control assembly 60 then directs hydraulic fluid to either hydraulic hose 40 or 42 depending upon which electrical conductor 132 or 134 is activated. In a mechanical interface, mechanical cables connect the actuator 130 to the steering control assembly 60.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A hydraulic system, comprising:
   a steering control assembly including a steering control unit and priority flow divider integrated into a unitary casing;
   an interface for fluidly coupling the casing for the steering control assembly directly to a casing for a control valve, wherein the control valve controls one or more hydraulic functions other than steering; and
   a common hydraulic pump port configured to supply hydraulic fluid to the steering control unit, the priority flow divider, and the control valve.

2. A hydraulic system, comprising:
   a steering control assembly including a steering control unit and priority flow divider integrated into a unitary casing;
   an interface for fluidly coupling the casing for the steering control assembly directly to a casing for a control valve, wherein the control valve controls one or more hydraulic functions other than steering; and
   a tank return channel formed internally in the steering control assembly casing that fluidly connects to an internal return channel in the control valve.

3. A hydraulic system, comprising:
   a steering control assembly including a steering control unit and priority flow divider integrated into a unitary casing;
   an interface for fluidly coupling the casing for the steering control assembly directly to a casing for a control valve, wherein the control valve controls one or more hydraulic functions other than steering; and
   an external tank return port used by both the steering control assembly and the control valve.

4. A hydraulic system, comprising:
   a steering control assembly including a steering control unit and priority flow divider integrated into a unitary casing; and
   three or fewer than three external hydraulic hose ports on the steering control assembly.

5. A hydraulic system, comprising:
   a control valve, wherein the control valve controls one or more hydraulic functions other than steering; and
   a steering control assembly including a steering control unit and a priority flow divider contained in a single unitary casing, the steering control assembly attached adjacently with and directly to the control valve by means of an interface that fluidly connects the control valve with the steering control assembly.

6. The hydraulic system according to claim 5 including three or fewer external hydraulic hose ports on the steering control assembly.

7. The hydraulic system according to claim 5 including a tank return channel formed internally in the steering control assembly casing that fluidly connects to an internal return channel in the control valve.

8. The hydraulic system according to claim 5 including an external tank return port used by both the steering control assembly and the control valve.

9. The hydraulic system according to claim 5 including a load sense channel extending inside the single unitary casing used by the priority flow divider to determine when to direct hydraulic fluid to a control flow channel.

10. The hydraulic system according to claim 9 including a priority flow channel formed in the single unitary casing that directs continuous hydraulic flow from a pump port to the steering control unit independently of a load sense signal.

11. The hydraulic system according to claim 5 including an internal control flow channel extending inside the single unitary casing that fluidly couples a control flow from the priority flow divider to the steering control unit.

12. The hydraulic system according to claim 11 including an internal excess flow channel fluidly coupling excess hydraulic fluid not directed through the internal control flow channel to the control valve.

13. The hydraulic system according to claim 5 wherein the casing for the steering control assembly couples to a casing for the control valve without the use of external fluid connectors.

14. A hydraulic assembly, comprising:
    a steering control unit;
    a priority flow divider;
    a steering control assembly that forms internal channels that fluidly couple the steering control unit to the priority flow divider; and
    a control valve that controls one or more hydraulic functions other than steering, wherein the control valve fluidly interconnects with the steering control assembly without the use of external fluid connectors.

15. The hydraulic assembly according to claim 14 including a load sense channel formed in a casing between the steering control assembly and the priority flow divider.

16. The hydraulic assembly according to claim 14 including a priority flow channel formed in a casing that directs continuous hydraulic flow from a pump port to the steering control unit independently of a load sense signal.

17. The hydraulic assembly according to claim 14 including an internal control flow channel formed in the assembly that directs hydraulic flow from the priority flow divider to the steering control unit according to a load sense signal.

18. The hydraulic assembly according to claim 14 wherein the steering control assembly includes three or fewer external hydraulic hose ports.

19. The hydraulic assembly according to claim 14 wherein the steering control assembly is attached adjacently with and directly to the control valve by means of bolts, screws, rivets, welding, or other fastening systems.

20. The hydraulic assembly according to claim 14 wherein the control valve, steering control unit, and the priority flow divider are contained in a single unitary casing.

* * * * *